(12) United States Patent
Toppari et al.

(10) Patent No.: US 9,016,661 B2
(45) Date of Patent: Apr. 28, 2015

(54) BOOSTER FOR A DIGITAL HYDRAULIC CONTROLLER AND METHOD FOR USING A BOOSTER IN CONNECTION WITH A DIGITAL HYDRAULIC CONTROLLER

(71) Applicants: Juhani Toppari, Nuppulinna (FI); Eero Suomi, Hämeenlinna (FI)

(72) Inventors: Juhani Toppari, Nuppulinna (FI); Eero Suomi, Hämeenlinna (FI)

(73) Assignee: Valmet Technologies, Inc., Espoo (FI)

( * ) Notice: Subject to any disclaimer, the term of this patent is extended or adjusted under 35 U.S.C. 154(b) by 279 days.

(21) Appl. No.: 13/655,290

(22) Filed: Oct. 18, 2012

(65) Prior Publication Data

US 2013/0098461 A1     Apr. 25, 2013

(30) Foreign Application Priority Data

Oct. 21, 2011   (EP) .................................... 11186125

(51) Int. Cl.
*H01F 7/18* (2006.01)
*F15B 11/04* (2006.01)
*H02M 3/155* (2006.01)
*H02P 25/02* (2006.01)
*H01H 47/32* (2006.01)

(52) U.S. Cl.
CPC .............. *F15B 11/04* (2013.01); *H01F 7/1805* (2013.01); *H01H 47/325* (2013.01); *H02M 3/155* (2013.01); *H02P 25/028* (2013.01)

(58) Field of Classification Search
CPC .............. F16K 31/0675; H01F 7/1805; H01F 2007/1822; F02D 2041/2003; F02D 2041/2013

USPC ........................ 251/129.01, 129.04, 129.15
See application file for complete search history.

(56) References Cited

U.S. PATENT DOCUMENTS

| | | | | |
|---|---|---|---|---|
| 5,954,030 A * | 9/1999 | Sturman et al. | ................ | 123/446 |
| 6,050,281 A * | 4/2000 | Adams et al. | ...................... | 137/1 |
| 6,810,906 B2 * | 11/2004 | Tanaka et al. | .............. | 137/487.5 |
| 7,101,462 B2 * | 9/2006 | Bricco et al. | .................. | 162/355 |
| 7,389,968 B2 * | 6/2008 | Katoh et al. | ............. | 251/129.04 |
| 7,823,860 B2 * | 11/2010 | Ueda | ........................ | 251/129.04 |
| 2004/0140077 A1 * | 7/2004 | Bricco et al. | .................. | 162/209 |
| 2009/0323247 A1 * | 12/2009 | Schmidt | ........................ | 361/160 |

FOREIGN PATENT DOCUMENTS

| | | |
|---|---|---|
| DE | 10034458 A1 | 1/2002 |
| DE | 102009026604 A1 | 9/2010 |
| GB | 2368985 A | 5/2002 |
| WO | 2010136269 A1 | 12/2010 |

OTHER PUBLICATIONS

Extended European Search Report for EP11186125 dated Mar. 30, 2012.
Paul Horowitz et al., The Art of Electronics, Second Edition, Cambridge University Press, 1989, Chapter 1, Section 1.31. p. 52 and part of 53. The reference shows in Fig. 1.95 showing a diode for blocking inductive kick, and is reverent to New Claim 20.

* cited by examiner

*Primary Examiner* — Matthew W Jellett
(74) *Attorney, Agent, or Firm* — Stiennon & Stiennon

(57) ABSTRACT

A booster for a digital hydraulic controller which has at least one digital valve (40). The booster is connected to a magnetic coil (41) of a valve stem (42) of the digital valve (40) by at least two voltages (21, 22) wherein one voltage (21) is higher than the other voltage (22). The invention also relates to a method for using a booster in connection with a digital hydraulic controller.

19 Claims, 3 Drawing Sheets

BOOSTER FOR A DIGITAL HYDRAULIC CONTROLLER AND METHOD FOR USING A BOOSTER IN CONNECTION WITH A DIGITAL HYDRAULIC CONTROLLER

CROSS REFERENCES TO RELATED APPLICATIONS

This application claims priority on European Patent Application No. EP11186125, filed Oct. 21, 2011, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a booster for a digital hydraulic controller and a method for using a booster in connection with a digital hydraulic controller.

Digital hydraulic controller is used in a system based on digital hydraulics, in at least part of the components is based on digital valves that form digital valve groups. A digital valve group is a valve unit, in which there is at least one digital valve group, which again contains a number of digital valves connected in parallel in relation to the fluid flow passing through the digital valve group. A digital valve again is the valve intended for adjusting the fluid's volume flow, the valve having 2–N different stepped discrete adjustment modes, especially 2 different discrete adjustment modes (open/closed), and for which the control signal to be brought from the control system has advantageously been digitalized, such as binary form. The digital valve has advantageously two modes; it is either fully open or fully closed. When the digital valve is open, the entire volume flow of liquid allowed by the digital valve passes through it, and when the digital valve is closed, no liquid at all passes through it. Such a digitally controllable digital valve having two modes is also called an on/off valve and an on/off digital valve. The digital valve can also have more than two modes, in which case the valve is driven in a stepped manner from one mode to another. The digital valve can have three positions; it lets the liquid flow pass to a first or second direction, or then the valve does not allow any fluid to pass through it. The adjusting directive (control signal) is of a digital nature, such as binary. According to the adjusting directive, the volume flow from the digital valve group and the pressure caused by the flow are adjusted by opening a certain valve combination of the digital valve group so that a desired opening of the digital valve group and a desired volume flow of the fluid are achieved. Deviating from an analogue valve, each digital valve connected in parallel can only have a limited number of adjusting modes, i.e. the digital valve only has certain discrete flowing modes. In one digital valve form, it has three modes: open/closed/quick opening. However, each digital valve preferably has simply the on/off mode; when open, the valve lets a certain volume flow through it; when closed, it completely prevents the fluid from passing through. The digital valve group consists of digital valves with two modes (on/off). Typically two successive digital valves with nominal volume flow amounts, the volume flow passing through the valve with bigger nominal volume flow in the open position is always two times bigger than the volume flow of the valve with smaller nominal volume flow. A binary control signal can then be brought to such a digital value group, in which the control signal's magnitude has been converted into a binary number. As an exemplary comparison of differences in the adjustment method between an analogue valve and a hydraulic valve group, the following can be presented: if an analogue valve is adjusted with a control signal (adjusting directive), the magnitude of which is 12 units, the analogue valve stem moves a quantity comparable with 12 control units, in which case the valve lets through a volume flow that has increased respectively. Again, when a digital valve group consisting of five on/off digital valves connected in parallel to the input flow are controlled by a similarly dimensioned control signal (adjusting directive) of 12 units, in which the sizes of the volume flows the digital valves 1, 2, 3, 4, 5 let through are respectively 1, 2, 4, 8 and 16 units, the control signal is binary and sent into a control signal 01100 ($0\times2^4+1\times2^3+1\times2^2+0\times2^1+0\times2^0=12$) (corresponding to the valves 5, 4, 3, 2, 1), and the valves 3 and 4 are opened. Controllers for controlling digital hydraulics thus comprise a set of on/off valves which are connected in parallel and extend between an input line and an output line and for example for pressure control the controller has two sets of valves in which one set connects a feed line to an output line of the controller and other set connects the output line to a drain line.

In patent application DE 102009026604 is described a hydraulic cylinder assembly for a machine for producing a fiber web, especially a paper or cardboard making machine. This prior art assembly comprises a hydraulic cylinder having a cylinder housing and a piston which can be displaced inside the cylinder housing, said piston subdividing the cylinder housing into a chamber on the cylinder head side and a chamber on the cylinder back end side and at least one digital hydraulic pressure controller which is integrated into the assembly. The pressure controller is associated with the chamber on the cylinder head side and the chamber on the cylinder back end side and controls a supply of working fluid to and a discharge thereof from the chambers to adjust the pressure of the working fluid in at least one of the chambers of the hydraulic cylinder. This prior art publication teaches that important for the quality of the hydraulic control using digital controllers is the switching speed of individual valves that means how fast the valves can be opened or closed. For rapid movements of the valve body in the valve also great forces are needed to hold the valve in the controlled state. For this purpose boosters or amplifiers are suggested in order to provide the coil of the electromagnetically actuated valve fast switching so that a stronger magnetic field is produced and the valve body can be moved fast. Problematic in this prior art document is that it does not give any actual examples as how to provide the hydraulic cylinder assembly with digital valves with such a booster or amplifier neither is such available commercially.

An attempt is known to the applicant in which the booster was provided with one channel and a special coil was used with 24 V input voltage located inside but this attempt proved not to function. Thus there is no practical solution available to be used in connection with commercially available digital valves in connection with normal automation system. Thus the problem of rapid enough state change of a digital valve is unsolved in prior art.

SUMMARY OF THE INVENTION

An object of the invention is to develop a booster or an amplifier that is suitable to be used in connection with hydraulic cylinder assemblies.

It is also a non-limiting object of the invention to achieve a booster or an amplifier that can be used in connection with digital valves of prior art without need to reconstruct the digital valve.

A non-limiting further object of the invention is to provide a booster that significantly improves the speed of switching the state of a digital valve.

It is further a special object of the invention to considerably improve the operation of hydraulic cylinder assemblies with digital valves.

In view of the above, the object of the invention is to provide a booster for a digital hydraulic controller.

By the invention a booster or an amplifier is achieved that is well suitable to be used in connection with valves of digital hydraulic controllers for fast switching of the state of the valve. The opening of the valve by the booster according to the invention is remarkably speeded up from about 30 ms to about 6 ms. By the booster the control signals of the digital controller are amplified to be suitable for digital valves, especially for normal digital valves without having to reconstruct the valve.

According to an advantageous embodiment of the invention one digital valve is controlled by two semiconductor switches, one which provides pulse with higher voltage and one to connect the lower voltage for trickle.

According to the invention the booster can also be provided with more than two different voltages.

According to an advantageous feature of the invention the booster has two different pre-generated voltages that are outside the card itself. In connection with switching the valve state from shut to open higher voltage is used first and then the lower voltage.

According to an advantageous feature of the invention the booster is located near the control source in connection with the valve.

The control is provided by three lines according to an advantageous feature of the invention, one of which is not used.

By the booster according to the invention the signal is amplified and a high voltage pulse is added and thus rapid state change of a digital valve is achieved.

In state "1" of a digital valve the high voltage provided by booster according to the invention accomplishes the rapid opening move of the valve and in state "0" the voltage difference between the higher voltage and the lower trickle voltage enables rapid discharge.

Method for using a booster in connection with a digital hydraulic controlled.

In connection with operation of the booster according to the invention following steps are taken to provide for fast switching the digital valve state and in the method for using a booster in connection with a digital hydraulic controller advantageously the following steps are taken:
 the input card signal is controlled to the open state "1"
 voltage higher than the trickle voltage is connected to the coil of the valve
 higher voltage is held connected for a short time wherein the current of the coil increases fast
 when the current has increased the higher voltage is cut off after which the lower trickle voltage keeps the valve activated
 input signal is controlled to the close state "0"-input voltage is cut off from the coil
 energy storage of the valve coil forces the current flow to continue until the energy of the magnetic field is discharged
 current flows via the diodes and current supplies until the energy is discharged
 after the discharge of the magnetic field the spring presses the valve stem to the beginning position The present invention provides for many advantages. The system is simplified which brings cost savings both in relation to the functional property and especially in relation to the properties in product. The invention provides for possibilities of creating rapid on/off-function in connection with digital valve technique. As the system is simplified also testing and using is easier which all factors lower the production cost of machine as well as advance functions of the machine where the digital valve technique is used. The digital valve technique is also known as being safe even when malfunctions occur. Also the possible malfunction is better controllable than in connection with prior art control valves since the state switching is faster. In the manner disclosed by the invention, fast state switch can be carried out using digital valve in the manner described later in connection with different embodiments, thus achieving several of the said pursued benefits.

The booster according to the invention and the method for using the booster is very advantageously used in connection with digital valve controllers used in connection with fiber machines. In these applications many advantages is used by the invention, such as: nip loading in calenders, reels and winders.

In connection with the description and claims the following terms are used for facilitating the explanation: the term liquid is mainly used of the pressure medium, but actually this is a fluid, the characteristics of which especially include flowability. This fluid can be liquid, gas or, for example, a mixture of liquid and gas or a mixture of some other, for example, solid component part.

BRIEF DESCRIPTION OF THE DRAWINGS

The invention will next be explained in more detail, referring to the enclosed drawings, in which.

DESCRIPTION OF THE PREFERRED EMBODIMENTS

In the following some advantageous embodiments and features of the invention are explained by referring to the schematically presented examples of FIGS. 1-3. It should be understood that the invention is not limited to these examples and many modifications are possible. In the figures same reference signs are used for respective components and parts of the examples unless otherwise mentioned.

Figure 1:
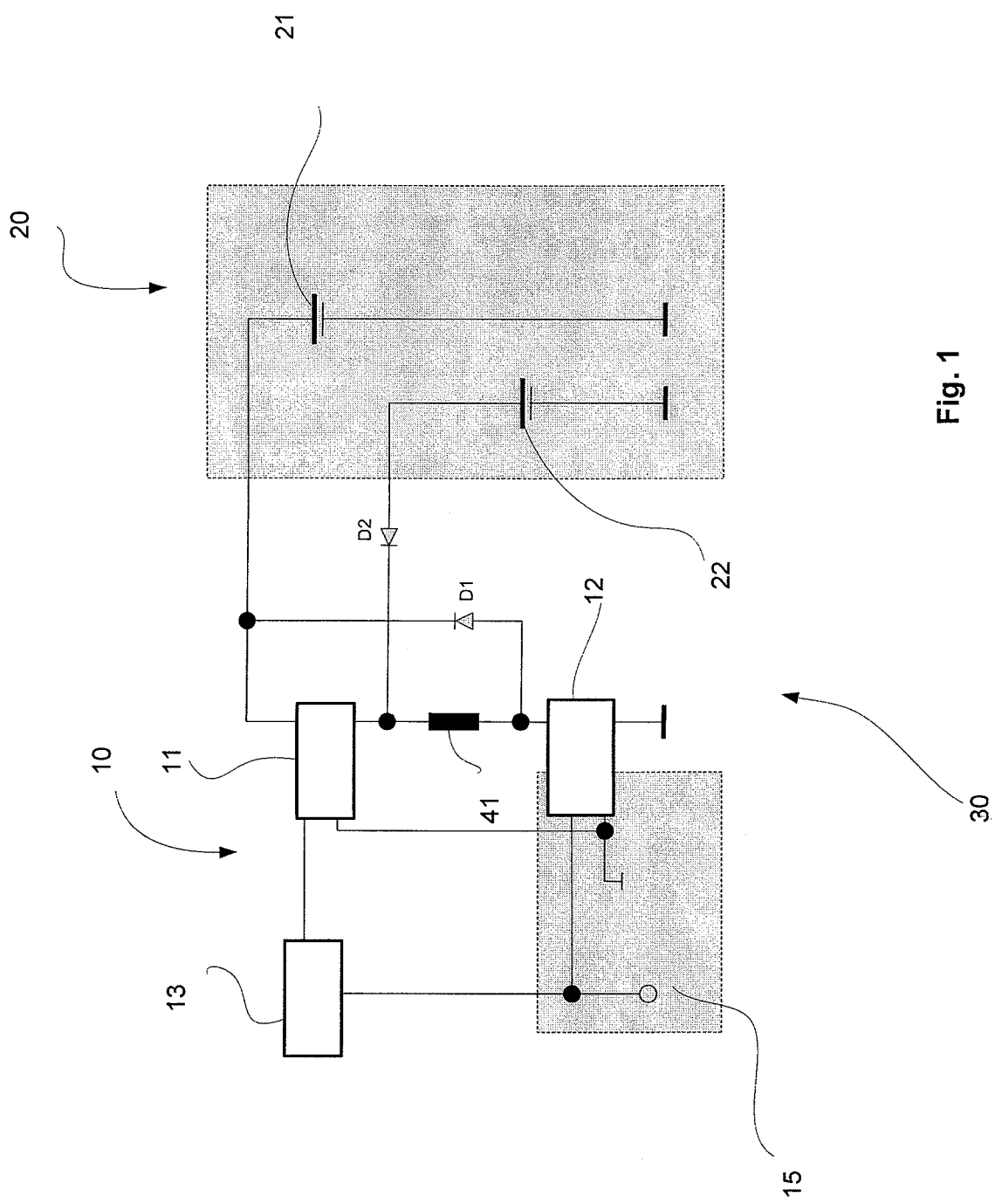
FIG. 1 illustrates schematically one example of one advantageous embodiment of the invention.

In FIG. 1 one example of the booster 30 according to the invention is presented. In the figure a booster card 10 and current supplies 20 are shown. The current supplies comprise two voltages 21, 22. One voltage 21 is higher than the other lower voltage 22 that covers for the trickle voltage. The higher voltage 21 is for example 90–20 V, advantageously 50–30 V and the lower voltage is 24–2 V, advantageously 12-8 V. The booster can also be provided with more than two different voltages. The booster card 10 comprises two semiconductor switches 11, 12 and a pulse former 13. The control signal is transferred via a control signal connection 15. One digital valve is controlled by two semiconductor switches 11, 12, one which provides pulse from the pulse former 13 with higher voltage 21 and one to connect the lower voltage 22 for trickle. The booster 30 has two different pre-generated voltages 21, 22 that are outside the booster card 10 itself. In connection with switching the valve 40 (FIG. 2) states from shut to open, the higher voltage 21 is used first and then the lower voltage 22. By the booster 30 the signal 15 is amplified and the high voltage 21 pulse is added in the pulse former 13 and thus rapid state change of a digital valve 40 (FIG. 2) is achieved.

Figure 2:
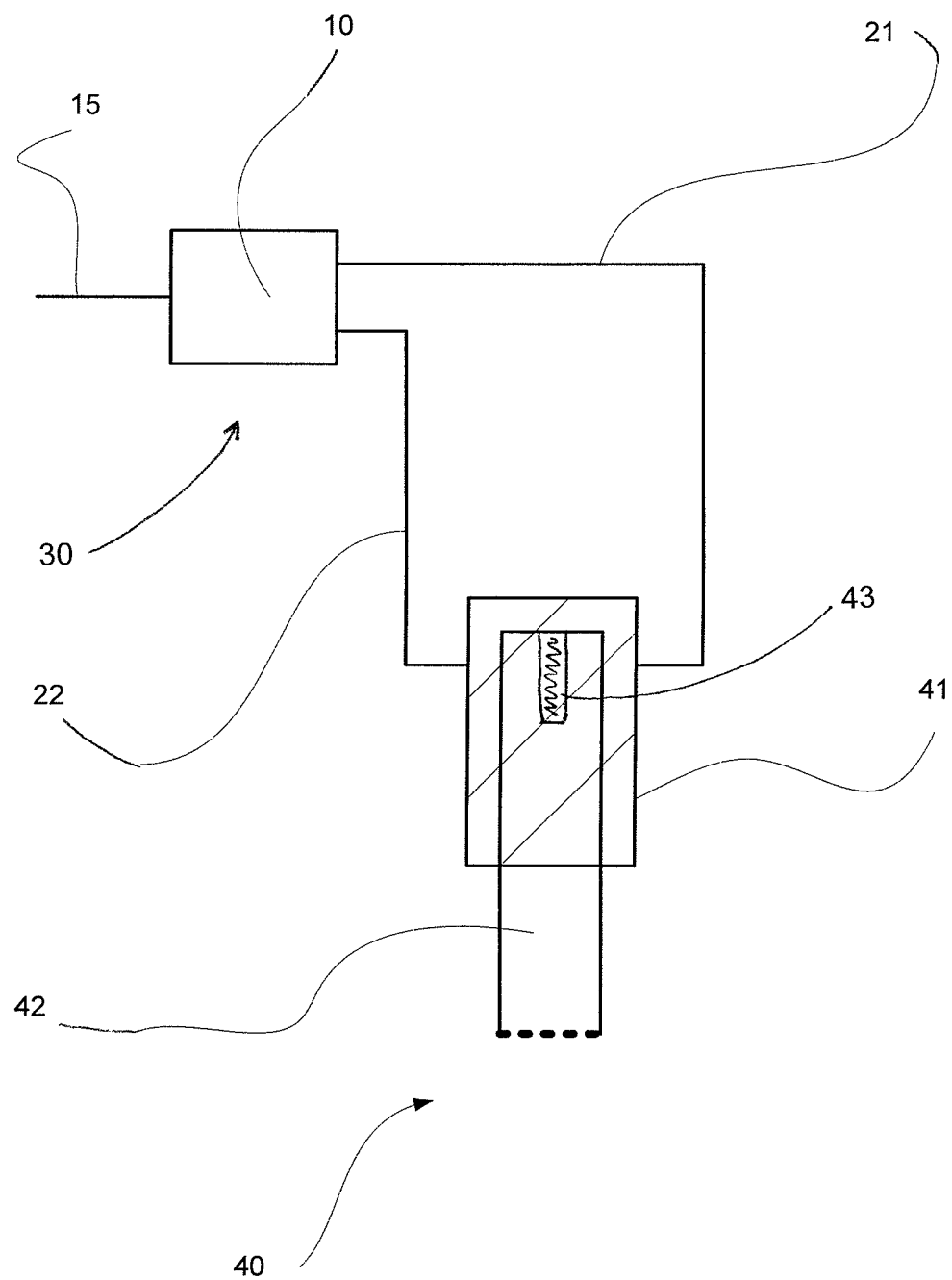
FIG. 2 illustrates schematically one example of digital valve arrangement in connection with one advantageous embodiment of the invention.

In FIG. 2 one example of a booster 30 according to the invention in connection with a digital valve 40 is shown. A control signal connection 15 is connected to the booster card 10 that is connected via the current supplies 20 voltage connections 21, 22 to the magnetic coil 41 of the digital valve 40. The magnetic coil 41 is around the valve stem 42 of the digital valve 40.

Figure 3:
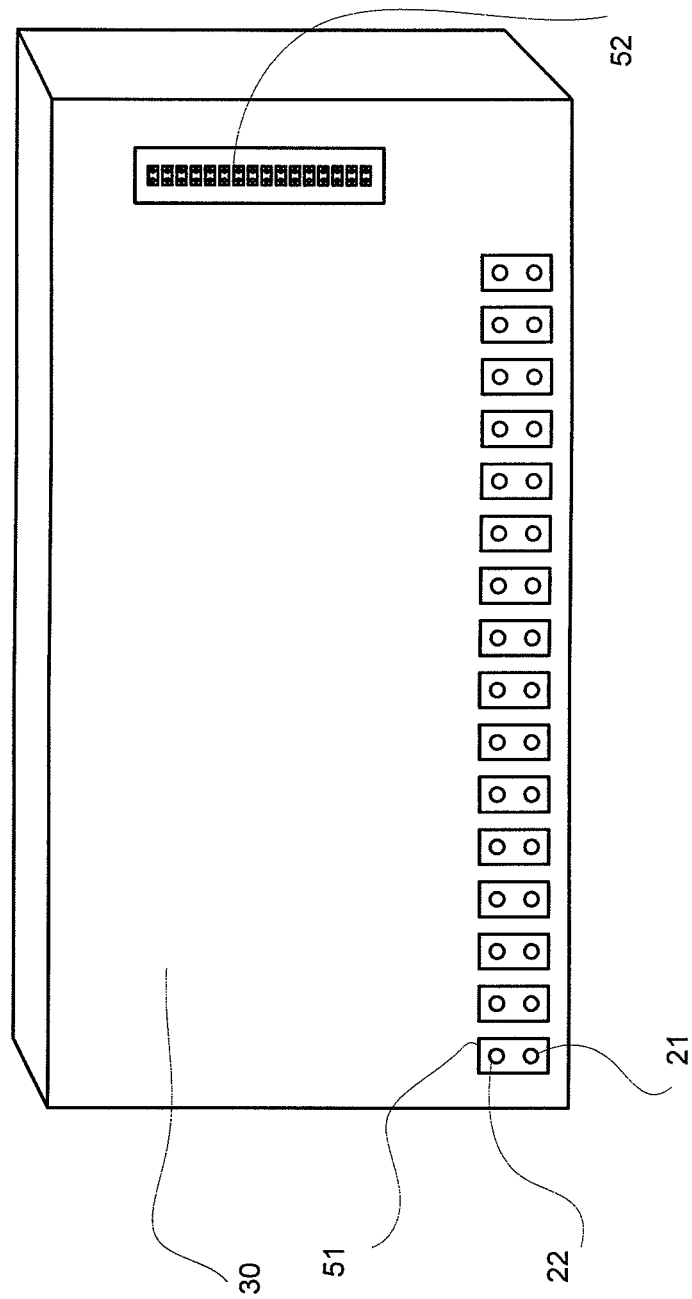
FIG. 3 illustrates schematically one example of one advantageous embodiment of a booster box according to the invention.

In FIG. 3 a schematic presentation of a booster 30 for digital valve group of a digital hydraulic controller is shown. In this example the booster 30 has sixteen connection points 51 for voltage connections 21, 22 to the magnetic coil 41 (FIG. 2) of the valve stem 42 (FIG. 2). The booster 30 is connected to low current control by cable connection point 52.

In connection with operation of the booster 30 according to an example of invention following steps are taken to provide for fast switching the digital valve state and in the method for using the booster in connection with a digital hydraulic controller the following steps are taken: In the beginning the control signal 15 of the input pulse 13 for card signal is controlled to the open state "1" and the higher voltage 21 than the lower trickle voltage 22 is connected to the coil 41 of the valve 40. The higher voltage 21 is held connected for a short time wherein the current of the coil 41 increases fast. When the current in the coil 41 has increased the higher voltage 21 is cut off after which the lower trickle voltage 22 keeps the valve 40 activated and the stem 42 is kept thus in open position. Then the control signal 15 of input pulse 13 is controlled to the close state "0" and the input voltage is cut off from the coil 41 and the energy storage in the valve coil 41 forces the current flow to continue until the energy of the magnetic field is discharged. The current flows via the semiconductor switches 11, 12 and current supplies 20 until the energy is discharged. After the discharge of the magnetic field the spring 43 presses the valve stem 42 to the beginning position. In the open state "1" of a digital valve the high voltage 21 provided by booster 30 accomplishes the rapid opening move of the valve 40 and in the close state "0" the voltage difference between the higher voltage 21 and the lower trickle voltage 22 enables rapid discharge of the coil 41.

The booster 30 is to be used in connection with valves 40 of digital hydraulic controllers for fast switching of the state of the valve 40. The opening of the valve by the booster 30 according to the invention is speeded up from about 30 ms to about 6 ms. By the booster 30 the control signals 15 of the digital controller are amplified to be suitable for normal digital valves 40 without having to reconstruct the valve.

We claim:

1. A device for increasing the speed of actuation of a multiplicity of digital valves arranged as a digital valve group such that the multiplicity of digital valves are connected in parallel in relation to a fluid flow source, the device comprising:
   a first cable connection point, having a multiplicity of discrete first wire connectors for receiving a control signal;
   wherein the device has for each of said multiplicity of discrete first wire connectors, a corresponding second cable connection point, each second cable connection point having a second wire connector and a third wire connector;
   a first current supply having a first voltage and connected to a ground and having a first current output;
   a second current supply having a second voltage connected to the ground and having a second current output;
   wherein the second voltage is higher than the first voltage of the first current supply;
   an electric circuit for each discrete first wire connector and the corresponding second cable connection point, the electric circuit further comprising:
   a first electrical connection between one of said second wire connectors and the first current output without a switch therebetween;
   a first semiconductor switch between the ground and the third wire connector;
   a second semiconductor switch between the second wire connector and the second current output; and
   a pulse former connected by an electrical conductor to each discrete first wire connector to receive a control signal, and connected to the first semiconductor switch and the second semiconductor switch, to close the first and second semiconductor switches for a first time period and to close only the first semiconductor switch during a second time period.

2. The device of claim 1 wherein there are sixteen discrete first wire connectors.

3. The device of claim 1 wherein the first voltage is between 2 volts and 24 volts.

4. The device of claim 3 wherein the first voltage is between 8 volts and 12 volts.

5. The device of claim 1 wherein the second voltage is between 20 volts and 90 volts.

6. The device of claim 5 wherein the second voltage is between 30 volts and 50 volts.

7. The device of claim 1 wherein the pulse former is arranged to connect the first semiconductor switch and the second semiconductor switch for at least 6 ms.

8. A device for increasing the speed of actuation of a multiplicity of digital valves arranged as a digital valve group such that the multiplicity of digital valves are connected in parallel in relation to a fluid flow source, the device comprising:
   a first cable connection point, having a multiplicity of discrete first wire connectors for receiving a control signal;
   wherein the device has for each of said multiplicity of discrete first wire connectors, a corresponding second cable connection point, each second cable connection point having a second wire connector and a third wire connector;
   a first current supply having a first voltage and connected to a ground and having a first current output;
   a second current supply having a second voltage connected to the ground and having a second current output;
   wherein the second voltage is higher than the first voltage of the first current supply;
   an electric circuit for each first discrete wire connector and the corresponding second cable connection point, the electric circuit further comprising:
   a first electrical connection between one of the second wire connectors and the first current output through a first diode therebetween;

a first semiconductor switch between the ground and the third wire connector;

a second semiconductor switch between the second wire connector and the second current output;

a second diode connected between the third wire connector and the second current output;

a pulse former connected by an electrical conductor to each discrete first wire connector to receive a control signal, and connected to the first semiconductor switch and the second semiconductor switch, to close the first and second semiconductor switches for a first time period and to close only the first semiconductor switch during a second time period.

9. The device of claim 8 wherein the first voltage is between 2 volts and 24 volts.

10. The device of claim 9 wherein the first voltage is between 8 volts and 12 volts.

11. The device of claim 8 wherein the second voltage is between 20 volts and 90 volts.

12. The device of claim 11 wherein the second voltage is between 30 volts and 50 volts.

13. The device of claim 8 wherein the pulse former is arranged to connect the first semiconductor switch and the second semiconductor switch for at least 6 ms.

14. A device comprising:

a first cable connection point, having a multiplicity of discrete first wire connectors for receiving a control signal;

wherein the device has for each of said multiplicity of discrete first wire connectors, a corresponding second cable connection point, each second cable connection point having a second wire connector and a third wire connector;

a first current supply having a first voltage and connected to a ground and having a first current output;

a second current supply having a second voltage connected to the ground and having a second current output;

wherein the second voltage is higher than the first voltage of the first current supply;

an electric circuit for each discrete first wire connector and the corresponding second cable connection point, the electric circuit further comprising:

a first electrical connection between one of the second wire connectors and the first current output without a switch therebetween;

a first semiconductor switch between the ground and the third wire connector;

a second semiconductor switch between the second wire connector and the second current output;

a pulse former connected by an electrical conductor to each discrete first wire connector to receive a control signal, and connected to the first semiconductor switch and the second semiconductor switch, to close the first and second semiconductor switches for a first time period and to close only the first semiconductor switch during a second time period;

a digital valve group comprising:

a multiplicity of digital valves connected in parallel to a source of fluid flow;

wherein each valve of the multiplicity of digital valves has a valve stem and a magnetic coil around the valve stem;

wherein the magnetic coil has a first lead connected to one of said second wire connectors in one of the corresponding second cable connection point; and wherein the magnetic coil has a second lead connected to one of said third wire connectors in the same corresponding second cable connection point.

15. The device of claim 14 wherein the first voltage is between 2 volts and 24 volts.

16. The device of claim 15 wherein the first voltage is between 8 volts and 12 volts.

17. The device of claim 14 wherein the second voltage is between 20 volts and 90 volts.

18. The device of claim 17 wherein the second voltage is between 30 volts and 50 volts.

19. The device of claim 14 wherein the pulse former is arranged to connect the first semiconductor switch and the second semiconductor switch for at least 6 ms.

* * * * *